Feb. 5, 1952     E. BLUMAUER     2,584,183
BOTTLE ATTACHMENT DEVICE FOR USE
IN PREPARING SPARKLING BEVERAGES
Filed Sept. 14, 1949
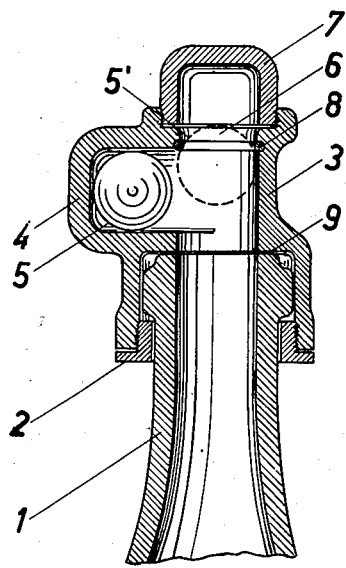
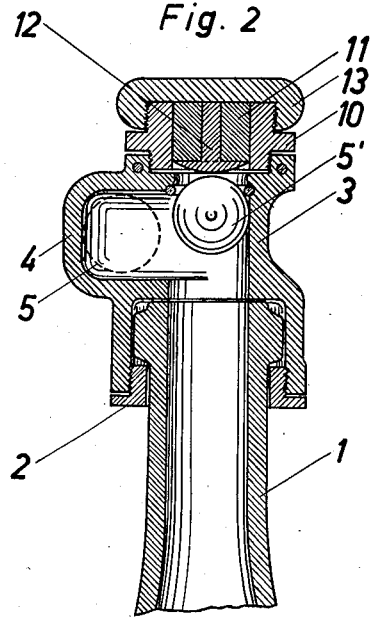
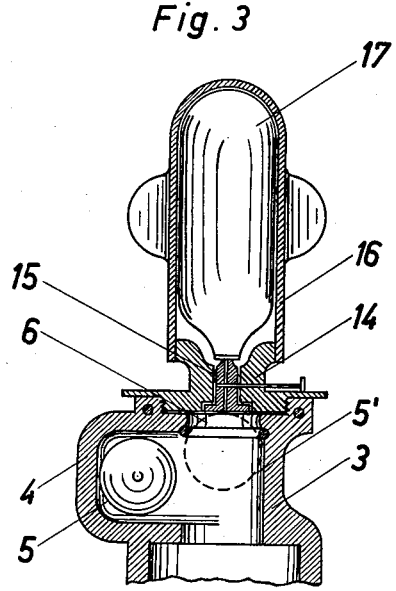
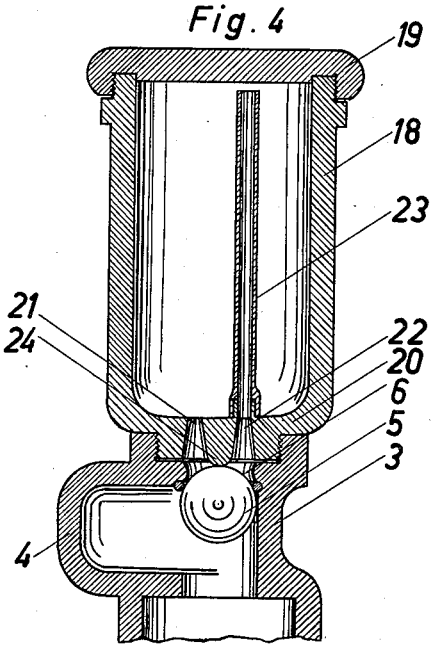

Patented Feb. 5, 1952

2,584,183

UNITED STATES PATENT OFFICE 2,584,183

BOTTLE ATTACHMENT DEVICE FOR USE IN PREPARING SPARKLING BEVERAGES

Ernst Blumauer, Graz, Styria, Austria, assignor to Leopold Adolf Polzer, Graz, Styria, Austria Application September 14, 1949, Serial No. 115,584
In Austria July 15, 1949

14 Claims. (Cl. 99—35)

This invention relates to a device, suitable for household use, for the preparation of sparkling wines and other effervescent beverages, in particular fruit drinks, ice-cream sodas, and so forth.

In accordance with the invention a device in the form of a hollow fitting adapted to be tightly attached to the neck of a bottle, as by means of a screw-threaded member, presents an aperture capable of being opened or closed at will by means of an externally operated element, and also by a valve which is seated under the internal pressure in the bottle.

The device is used both during the preparation of the beverage in the bottle and subsequently when discharging the contents of the bottle. In the first instance the aperture in the hollow fitting or head is closed by a cup-shaped cap or similar component which when the contents of the bottle are fermenting with the bottle in the inverted position, serves to receive the yeast dregs settling during fermentation. In order to open the bottle a sealing ring is screw-threaded or otherwise fitted over the aperture in the hollow fitting, the opening through this ring being adapted to receive a plug holding the valve open. The said opening is closed externally by a cover removable from the ring.

A further feature of the invention is a dosage device supplementing the above fitting for the correct quantitative addition of liquers or the like for the purpose of improving the taste and preventing any further fermentation. Preferably in accordance with this feature of the invention a receptacle for liqueur, provided with closure means, is screwed on to the above-mentioned hollow fitting. The base of the receptacle has one opening for the exit of the liqueur and another opening for pressure equalisation, and it also has a projection by which the pressure seated valve is displaced out of the position in which it closes the aperture of the hollow fitting when the receptacle is applied. The projection is suitably rounded, e. g. made in the form of a portion of a sphere or hemisphere, so as to develop the least amount of friction in contact with the valve.

The accompanying drawings show examples of the various uses of one constructional form of the device.

Fig. 1 is a vertical section of this device as used on a bottle in the preparation of sparkling wine by internal fermentation.

Fig. 2 is a similar section with the device adapted for enabling the bottle to be opened for use.

Fig. 3 is a vertical section through the device as used for the preparation of sparkling wine by charging with liquid carbon dioxide from a gas cartridge.

Fig. 4 is a vertical section through the device with dosage fitting attached.

The illustrated device is attached to the neck of a bottle by means of a screw-threaded split ring 2: it comprises a hollow fitting 3 of any suitable material, for example a synthetic plastic, with a ball-trap 4 containing a ball 5 acting as an internal valve. An aperture 6 of the fitting 3 receives (Fig. 1) a screwed-on cup 7 acting as an external sealing element and serving to receive the yeast dregs collecting during fermentation with the bottle inverted. 8 and 9 are packings or gaskets.

When it is intended to make the bottle ready for use the cup 7 is replaced by a sealing ring 10 (Fig. 2) preferably of synthetic plastic, which is screwed on to the fitting and contains in its slightly conical bore a cored cork stopper 11. The core of the cork stopper is filled with a plug 12 of hardwood or other suitable material, which is mushroom shaped. A removable cap 13, of synthetic plastic or other suitable material, is applied to the ring 10. As the ring 10 is screwed home it depresses the ball valve 5 from its seat against the internal gas pressure. If the bottle is held in a suitable position the released ball valve 5 falls into the ball trap 4. If then the plug cap 13 is unscrewed and removed the stopper 11 will be expelled with a loud report. If the opening of the bottle is required to be soundless, the sealing ring 10 complete with the cap 13 and the stopper means 11, 12 must be screwed off.

The process of preparation of a sparkling wine proceeds as follows: New wine one year old or Ribisel wine or fruit must alone or with fruit juice (for instance pear must with peach or strawberry juice) is filled in the bottle and some sugar added and allowed to dissolve. The fitting in accordance with Fig. 1 is screwed on and the bottle placed in a plain, wooden stand such as used in champagne cellars in an inverted position. During the rapidly-commencing fermentation which continues according to the cellar temperature for 4 to 6 weeks, the bottle is abruptly rotated about the longitudinal axis at intervals of 8 to 15 days approximately by which means the yeast dregs accumulating in the neck of the bottle are freed and drop into the cup 7. After about 2 months the bottle is slightly tilted, still remaining inverted in such manner that the ball valve 5 assumes the seating position 5' opposite the cup. The latter is now removed and the bottle placed bottom downwards. As a protection against soiling and for better appearance, a light plastic cap is screwed on. The domestically-prepared sparkling wine is now ready but protracted keeping improves its quality.

In the domestic preparation of sparkling wine the device according to the invention replaces the unstoppering and recorking after completion of fermentation performed in champagne cellars by experienced operators for which, in addition to great skill, special appliances are required and which could not in fact be performed in a small household.

An advantage of the device of the invention is that partly-full bottles may be reclosed by means of the ball valve 5, by simply inverting and slightly shaking the bottle. The ball valve which, during pouring remains in the ball trap 4, can easily be brought into the position 5'.

The device can also be used as represented in Fig. 3 for the preparation of sparkling wine or other effervescent beverage by impregnation with liquid carbon dioxide. For this purpose the usual perforated metal plug 14 with the perforated steel stem 15 is screwed into the threaded aperture 6 of the hollow fitting 3 above the ball valve 5'. The casing 16 containing the cartridge 17 with the calculated quantity of liquid carbon dioxide for charging the contents of the bottle, is screwed on to the metal plug 14. By this means the mouthpiece of the cartridge 17 is pressed against the steel stem 15 and unsealed by the latter. The carbon dioxide flows into the bottle and charges the liquid contained therein.

During all the manipulations described the bottle should preferably be enclosed in a protecting container of wire netting and straw plait.

In the arrangement for dosage shown in Fig. 4 a liqueur receptacle 18 is screwed on to the threaded aperture 6 of the hollow fitting 3 attached on the neck of the bottle, being closed by a screw cap 19. The bottom 20 of the receptacle 18 is provided with two tapered holes 21, 22. A thin-walled tube 23 is arranged above the one hole 22, ending shortly beneath the cap 19. Between the two holes 21, 22 the bottom is further provided with an external, hemispherical protuberance 24 which when the receptacle is screwed in depresses the ball valve 5 from the closing position with the least amount of friction. Simultaneously, the bottle is held in such a position that the ball valve 5 released by the pressure of the protuberance 24 is enabled to drop into the ball trap 4. The bottle is now placed upright and the liqueur enabled to flow through the opening 21 into the bottle where it mingles with the contents. After leaving the bottle to stand for a few minutes during which the foam in the neck of the bottle is enabled to settle, the ball valve 5 is returned in the manner already described into the mouth of the bottle, the dosage device 18 is unscrewed and the bottle with the finished sparkling wine or effervescent beverage placed in storage.

The dosage receptacle has a capacity of about 80–100 cubic centimetres since the added sugar requires such quantity of alcoholic liquor for its solution. A correspondingly smaller quantity of new wine is poured into the bottle which is then filled up with the dosage. The air cushion remaining during storage or fermentation prevents bursting of the bottle.

Sparkling wine manufactured with the aid of the device has exactly the agreeable taste of ordinary champagne.

I claim:

1. A device attachable to a bottle for use in preparing and subsequently discharging sparkling beverages, comprising, in combination, a hollow fitting having a through aperture presenting an internal valve seat, a valve trap communicating with the interior of the hollow fitting, a sleeve portion on one side of said seat for embracing a bottle neck, an outlet portion in the other side of said seat, and closure-attaching means on said outlet portion; releasable means co-acting with said sleeve portion for firmly clamping the fitting on a bottle neck; a valve within the fitting for co-acting with said valve seat under gaseous pressure in the bottle; and means for holding said valve unseated at will.

2. A device as set forth in claim 1, including a cup-like cap attachable to said outlet portion of the fitting for receiving yeast drops deposited during fermentation with the fitted bottle inverted.

3. A device as set forth in claim 1, including discharging means comprising a ring member attachable to said outlet portion of the fitting, a plug within the bore of said ring member for automatically unseating said valve on attachment of said ring member, and a cover removably attached to said ring member.

4. A device as set forth in claim 1, including means for supplying liquid carbon dioxide through the fitting, said means comprising a casing for a liquid carbon dioxide cartridge attachable to said outlet portion of the fitting, and means for controlling the flow from a cartridge inserted in said casing.

5. A device as set forth in claim 1, including a liquid dosage receptacle attachable to said outlet portion of the fitting, said receptacle having in its bottom two apertures one for exit of the dosage liquid and the other for pressure equalisation, an inward projection between said apertures for automatically unseating said valve of the fitting on attachment of said receptacle, and a cover removably attached to said receptacle.

6. A device as set forth in claim 5, said projection being rounded to minimise friction.

7. A device as set forth in claim 5, including within the receptacle a tube extending from said pressure equalizing aperture nearly to the top of the receptacle.

8. A device attachable to a bottle for use in preparing and subsequently discharging sparkling beverages, comprising a hollow fitting having a through aperture presenting an internal valve seat, a valve trap at one side of said fitting communicating with the interior thereof, a sleeve portion on one side of said seat for embracing a bottle neck, an outlet portion in the other side of said seat, and closure attaching means on said outlet portion, releasable means co-acting with said sleeve portion for firmly clamping the fitting on a bottle neck, and a valve within the fitting for co-acting with said valve seat under gaseous pressure in the bottle.

9. A device attachable to a bottle for use in preparing and subsequently discharging sparkling beverages, comprising a hollow fitting having a through aperture presenting an internal valve seat, a laterally offset closed ball trap at one side of the fitting and valve seat and communicating at the inside with the interior of the fitting, a sleeve portion on one side of said seat for embracing a bottle neck, an outlet portion in the other side of said seat, and closure-attaching means on said outlet portion; a closure for said outlet portion, releasable means co-acting with said sleeve portion for firmly clamping the fitting on a bottle neck, and a ball valve within the fitting for co-acting with said valve seat under gaseous pressure in the bottle.

10. A device as defined in claim 1, including discharging means comprising a ring member attachable in said outlet portion of the fitting and having a slightly conical bore, a plug within the bore of said ring member for automatically unseating said valve on attachment of said ring member, and a cover removably attached to said ring member.

11. A device as set forth in claim 1, including discharging means comprising a ring member attachable in said outlet portion of the fitting, a stopper in the bore of said ring member, a hard core through said stopper having an enlarged head at its inner end for automatically unseating said valve on attachment of said ring member, and a cover removably attached to said ring member.

12. A device attachable to a bottle having an external neck bead for use in preparing and subsequently discharging effervescent beverages, comprising, in combination, a hollow tubular fitting having a through aperture having an internally facing valve seat, a hollow imperforate lateral projection at one side of the fitting inwardly of and adjacent the valve seat and freely open at the inside to form a valve trap, said fitting having an inwardly facing shoulder at the inside of the trap to engage the bottle mouth and a sleeve at its inner end for embracing the bottle neck, a split ring threaded in sleeve portion for engagement with the inside of the neck bead to firmly clamp the fitting on the bottle neck with the shoulder in air tight contact with the bottle mouth, an outlet portion at the outside of the trap and seat, and a cup-like cap detachably secured in sealing engagement with said outlet portion.

13. A device attachable to a bottle having an external neck bead for use in preparing and subsequently discharging effervescent beverages, comprising, in combination, a hollow tubular fitting having a through aperture having an internally facing valve seat, a hollow imperforate lateral projection at one side of the fitting inwardly of and adjacent the valve seat and freely open at the inside to form a valve trap, said fitting having an inwardly facing shoulder at the inside of the trap to engage the bottle mouth and a sleeve at its inner end for embracing the bottle neck, a split ring threaded in sleeve portion for engagement with the inside of the neck bead to firmly clamp the fitting on the bottle neck with the shoulder in air tight contact with the bottle mouth, an outlet portion at the outside of the trap and seat, internal closure attaching means on said outlet portion, and a receptacle like member secured in said attaching means and having a cap portion and adapted to permit seating and unseating of the valve.

14. A method of preparing sparkling wine in a bottle having a hollow fitting on its neck with a passage having an internal valve seat, a valve therein adapted to seat outwardly under internal gas pressure in the bottle and unseat inwardly at one side of the passage and seat, and a cup-like cap detachably closing the outlet end of the fitting, comprising the steps of charging the bottle with new wine and sugar, then closing the neck of the bottle to form a receptacle extension on the bottle mouth, then storing the bottle in an inverted position, occasionally rotating the bottle during fermentation, tilting the bottle at the end of the required fermentation to cause the valve to seat under internal gas pressure in the bottle and the yeast drops therein to collect in the cap, then removing the cap together with the yeast drops collected therein, and then storing the bottle in an upright position until required for use.

ERNST BLUMAUER.

REFERENCES CITED

The following references are of record in the file of this patent:

UNITED STATES PATENTS

| Number | Name | Date |
|---|---|---|
| 277,758 | MacVay et al. | May 15, 1883 |
| 357,909 | Quillfeldt | Feb. 15, 1887 |
| 2,418,630 | Febbraro | Apr. 8, 1947 |